US007188317B1

(12) United States Patent  
Hazel (10) Patent No.: US 7,188,317 B1  
(45) Date of Patent: Mar. 6, 2007

(54) DYNAMIC MULTIPLE WINDOW DISPLAY HAVING INDEPENDENTLY LINKED WINDOWS

(75) Inventor: Thomas G. Hazel, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 09/880,504

(22) Filed: Jun. 13, 2001

(51) Int. Cl.
*G06F 3/00* (2006.01)

(52) U.S. Cl. ..................................... 715/804
(58) Field of Classification Search ................ 345/804, 345/802, 803, 805, 841, 853, 854, 855
See application file for complete search history.

(56) References Cited

U.S. PATENT DOCUMENTS

| | | | | | |
|---|---|---|---|---|---|
| 5,226,117 | A | * | 7/1993 | Miklos ........................ | 345/853 |
| 5,694,561 | A | * | 12/1997 | Malamud et al. ........... | 345/805 |
| 5,977,973 | A | * | 11/1999 | Sobeski et al. ............. | 715/798 |
| 6,008,809 | A | * | 12/1999 | Brooks ........................ | 345/792 |
| 6,421,072 | B1 | * | 7/2002 | Ku et al. .................... | 345/804 |
| 7,017,121 | B1 | * | 3/2006 | Gikas et al. ................ | 715/804 |

OTHER PUBLICATIONS

Winamp (version 1.10, Released Mar. 24, 1999).*
Window XP Professional (copyright 1981-2001).*
Frederikson, A., et al., "Temporal, Geographical and Categorical Aggregation Viewed through Coordinated Displays: A Case Study with Highway Incident Data," Proceedings of the Workshop on New Paradigms in Information Visualization and Manipulation in Conjunction with the Eight ACM International Conference on Information and Knowledge Management, Human-Computer Interaction Laboratory, University of Maryland, 2000 pp. 26-34, published Kansas City, MO.

Furnas, G., et al., "MuSE: A Multiscale Editor," Proceedings of the 11th Annual ACM Symposium on User Interface Software and Technology, 1998, pp. 107-116, published San Francisco, CA.

North, C., "Robust, End-User Programmable, Multiple-Window Coordination," Proceedings of the Conference on CHI 98 Summary: Human Factors in Computing Systems, Apr. 18-23, 1998, pp. 60-61.

North, C., et al., "User Controlled Overviews of an Image Library: A Case Study of the Visible Human," Proceedings of the First ACM International Conference on Digital Libraries, 1996, pp. 74-82, published Bethesdsa, MD.

Olston, C., et al., "DataSplash," Proceedings of ACM SIGMOD International Conference on Management of Data, 1998, pp. 550, 552, published Seattle, WA.

Walker, J., "Document Examiner: Delivery Interface for Hypertext Documents," Symbolics Inc., Nov. 1987, pp. 307-323.

* cited by examiner

*Primary Examiner*—Kristine Kincaid
*Assistant Examiner*—Thanh Vu
(74) *Attorney, Agent, or Firm*—Senniger Powers (57) ABSTRACT

A first primary display window displays first primary objects linked to a scope window. A second primary display window displays second primary objects linked to the scope window. The second primary objects are independent of the first primary objects. One or more secondary display windows display secondary objects linked to one of the primary display windows. A secondary display window may be linked to the scope window so that the secondary objects displayed in the secondary display window are linked to the scope window. Data to create a window may be query-driven and the window type may be data-driven. Window type may be changed after creation and windows may be docked to each other to prevent overlap. Windows may link back to the scope window.

47 Claims, 4 Drawing Sheets

DYNAMIC MULTIPLE WINDOW DISPLAY HAVING INDEPENDENTLY LINKED WINDOWS

TECHNICAL FIELD

The present invention relates to the fields of windowing and linking. In particular, this invention relates to dynamically creating, organizing and linking windows independent of each other.

BACKGROUND OF THE INVENTION

In typical multi-window navigation, a scope item selected in the scope (left side tree) window results in objects of the selected scope being displayed in the upper right display pane. When the user selects an object in the upper right display pane, details of the selected object appear in the lower right display pane. This is the typical model used for such applications as the Exchange software application by Microsoft Corporation. In other words, a single selection drives a single window. Although this simplicity in linkage provides some benefits, the lack of dynamics and the inability or limited ability to independently manipulate a work space view has limitations, particularly in more sophisticated software monitoring systems which are available. Therefore, there is a need for a system which can dynamically and independently link windows and which can provide drill down capabilities as well as the capability to link windows back to source windows.

The invention described below addresses these and other disadvantages.

SUMMARY OF THE INVENTION

The invention meets the above needs and overcomes deficiencies of the prior art by linking windows dynamically to allow administrators and/or users to create, organize and link windows independent of each other. Unlike the prior art, the creation, organization, and linkage between the windows of an application according to the invention is not hardcoded within the application. For example, dynamic linking means that content of windows, the placement of windows and the relationship between windows can be created, defined and controlled by administrators or users. The invention also links object windows back to the scope window. For example, a command or selection issued from an object window may change the focus or content of the scope window. In addition, the dynamic linking allows customized queries relative to varying data sources. As a result, a dynamic hierarchy of window linkage is created.

The split tree navigation system of the invention provides several advantages over the prior art. Administrators and/or users can dynamically create an organized windows independent of each other. In addition, administrators can create, link and organize window types that are specific to the administrator's task needs. As a result, multi-tree navigation with customized queries relative to varying data sources can be achieved. In this context, selection of a scope item can drive two or more windows within a child pane. Also, selection of an item within the child pane can drive other windows outside the scope of the child pane. Furthermore, windows in a particular pane can link back to modify the scope pane driving the display of the particular pane.

Alternatively, the invention may comprise other methods and systems. Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

According to the invention, a scope window displays objects designated by an administrator/user and retrieved from a database. The invention retrieves and displays in a first display window first objects linked to (or driven by) the scope window. The invention retrieves and displays in a second display window second objects linked to (or driven by) the scope window. The second objects are independent of and not linked to or driven by the first objects. The invention also permits an administrator or user to form a secondary display window displaying secondary objects independently linked to the one of the display windows and linked back to the scope window.

The linkage between the first display window and the scope window may be dynamically defined by an application developer so that parameters are passed from the scope window to drive the first display window and wherein the passed parameters are used in a query to control the display of the first display window. Alternatively or additionally, the linkage between the first display window and the scope window may be dynamically selected or modified by the user so that parameters are passed from the scope window to drive the first display window and wherein the passed parameters are used in a query to control the display of the first display window. Thus, the invention constitutes means for retrieving scope items in response to administrator and/or user input. The creation, organization, and linkage between the windows occurs dynamically, and does not require hardcoding by the user or application developer.

The scope window, the first display window and the second display window form a workspace view which may be saved either as a local view on a local drive or as a global view in a database shared by multiple users. The user can "drag and drop" or otherwise arrange multiple windows of the same or differing types (including the first display window and the second display window) to form the workspace view. The windows "snap" together so as to eliminate overlap and gap between the multiple windows. The user may select the scope items to be displayed by the scope window or an application developer may designate the scope items to be displayed by the scope window. When the user selects a displayed scope item in the scope window, the first objects in the first display window are linked to the selected scope item and the second objects in the second display window are linked to the selected scope item.

Figure 1:
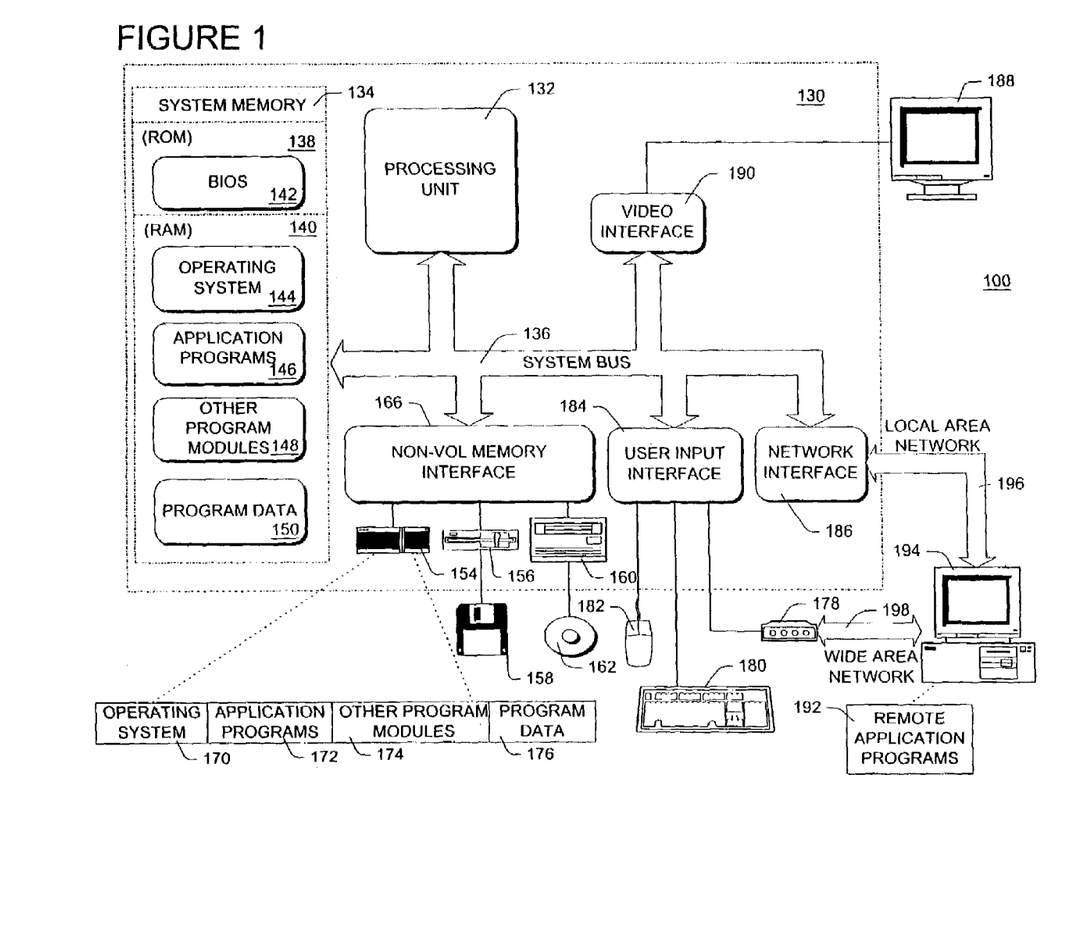
FIG. 1 is a block diagram of one embodiment of the method and system of the invention illustrating one example of a suitable computing system environment on which the invention may be implemented.

FIG. 1 is a block diagram of one embodiment of the method and system of the invention illustrating one example of a suitable computing system environment on which the invention may be implemented.

Referring first to FIG. 1, a block diagram illustrates one example of a suitable computing system environment 100 on which the invention may be implemented. The computing system environment 100 is only one example of a suitable computing or operating environment and is not intended to suggest any limitation as to the scope of use or functionality of the invention. Neither should the computing system environment 100 be interpreted as having any dependency or requirement relating to any one or combination of components illustrated in the exemplary computing system environment 100.

FIG. 1 shows one example of a general purpose computing device in the form of a computer 130. In a preferred embodiment of the invention, a computer such as the computer 130 is suitable for use with the invention. Computer 130 preferably has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 preferably includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 1 illustrates operating system 144, application programs 146, other program modules 148, and program data 150.

The computer 130 may also include other removable/non-removable, volatile/nonvolatile computer storage media. For example, FIG. 1 illustrates a hard disk drive 154 that reads from or writes to non-removable, nonvolatile magnetic media. FIG. 1 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 1, provide storage of computer readable instructions, data structures, program modules and other data for the computer 130. In FIG. 1, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a universal serial bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 1 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 1 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Figure 2:
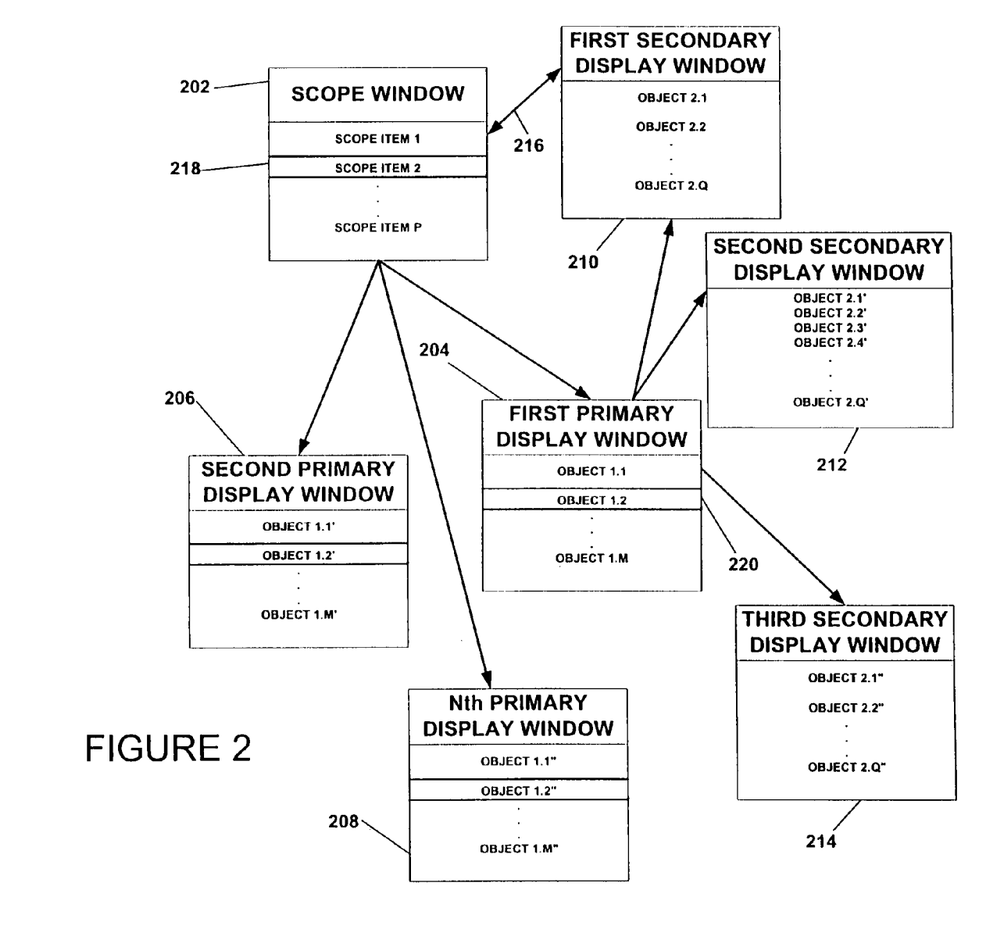
FIG. 2 is a diagram illustrating the linking of windows according to the invention.

In general, the invention constitutes a system such as described above for displaying on interface 194 child windows which display objects linked to parent windows. In one form, the invention constitutes a computer readable medium having computer-executed instructions for performing a series of steps to drive the multiple windows of the invention. Referring to FIG. 2, first a scope window 202 displaying scope items 1–N is created. The user may select the scope items to be displayed in the scope window. Alternatively, limited items may be available for display or the scope window may be predefined. For example, an application developer may designate the scope items to be displayed in the scope window. Next, a first primary display window 204 (a child window of scope window 202) is formed by selecting a scope item (e.g. scope item 2 designated by reference character 218). Window 204 displays first primary objects 1.1–1.M which are linked to the scope window 202. In general, the scope window 202 and/or a selected item 218 in the scope window 202 drives the first primary display window 204. In addition, a second primary display window 206 displaying secondary scope objects 1.1'–1.M' linked to the scope window 202 is also formed by selecting the same or another scope item. The scope window 202 and/or a selected item 218 in the scope window 202 drives the second primary display window 206. According to the invention, the second primary objects of the second primary display window 206 are independent of the first primary objects of the first primary display window 204 so that window 206 is driven independently of window 204. Optionally, the user may form additional windows such as Nth primary display window 208 by selecting the same or another scope item to display primary objects 1.1"–1.M" linked to the scope window 202. According to the invention, the third primary objects of the third primary display window 208 are independent of the first primary objects of the first primary display window 204. In addition, the third primary objects of the third primary display window 208 are independent of the second primary objects of the second primary display window 206.

The usability and convenience of the drill down features of the invention become readily apparent as additional child windows begin to be created. For example, at this point, the user may form a first secondary display window 210 by selecting an object in window 204 (e.g. object 2 designated by reference character 220) to display first secondary objects (e.g., objects 2.1–2.Q) linked to the first primary display window 204. In addition, the user may form a second secondary display window 212 by selecting the same or another object to display second secondary objects (e.g., objects 2.1'–2.Q') linked to the first primary display window 204. In this configuration, the second secondary objects of the second secondary display window 212 are independent of the first secondary objects of the first secondary display window 210. Optionally, the user may select the same or a third object to form an additional third secondary display window 214 displaying third secondary objects 2.1"–2.Q" which are linked to the first primary display window 204. In this option, the third secondary objects of the third secondary display window 214 are independent of the first secondary objects of the first secondary display window 210. In addition, the third secondary objects of the third secondary display window 214 are independent of the second secondary objects of the second secondary display window 212.

It is contemplated that the invention will have particular applicability in console applications as software development moves toward more system management applications. The discoverability and usability of the invention provides significant advantages over the prior art. For example, in the area of monitoring and systems management, it is important that administrators be able to "drill down" to find issues. The multipane navigation model according to the invention allows for this behavior without confusing the user. Each time the user double clicks on a pane to select an item, the system of the invention moves one level down in the scope tree and redisplays details about the selected item. This allows the user to quickly drill down through a hierarchy of containment without being forced to moving the cursor (mouse) around to find what they want. The user is no longer forced to hunt for data and is not limited by scope tree drill downs which ended with a few clicks.

In FIG. 2, most arrows are provided but not numbered to illustrate the linkage between the windows. It is noted that an arrow 216 appears between the scope window 202 and the first secondary display window 210. This is numbered and illustrated to represent that the invention contemplates that the first secondary display window 210 may be linked back to the scope window 202 so that the first secondary display window 210 is linked to the scope window 202 so that a command or selection in the first secondary display window 210 issued by an user will change the focus or content of the scope window 202.

As a general example, suppose an object is selected in first secondary display window 210 and a task is applied to the selected object to determine something related to the selected object, such as its status or service condition. After the task is run, various subitems appear in the first secondary display window 210 indicating the results of the applied task. Selecting one of the subitems at this point will cause the scope window 202 to change its display and focus because of the linking of the first secondary display window 210 back to the scope window 202.

In other words, a command issued in a secondary window is linked or communicated to the scope window and is not necessarily limited to the item with which the command is executed. As an example, the first primary display window 204 and the first secondary display window 210 may be linked by a task which places memory requirements in columns. If a user selects a particular memory in a column of the first secondary display window 210 for a further task, this selection will cause the further task to be executed against the scope window 202 which is linked to the first secondary display window 210 because of the cross communication between the first secondary display window 210 and the scope window 202. This communication between windows can be accomplished in several ways including the following. Each object within a first object window has a task list. Other object windows share the same task list. By executing a task on the first object window, the task is executed on the other object windows which shared the same task list.

As another general example, suppose a user changes to a child mode in an object window linked to an object window. Since the scope window is linked to the object window, such a change will cause a corresponding change in the focus of the scope window so that the scope window would display alternate information related to the child mode which is available to the scope window.

Figure 3:
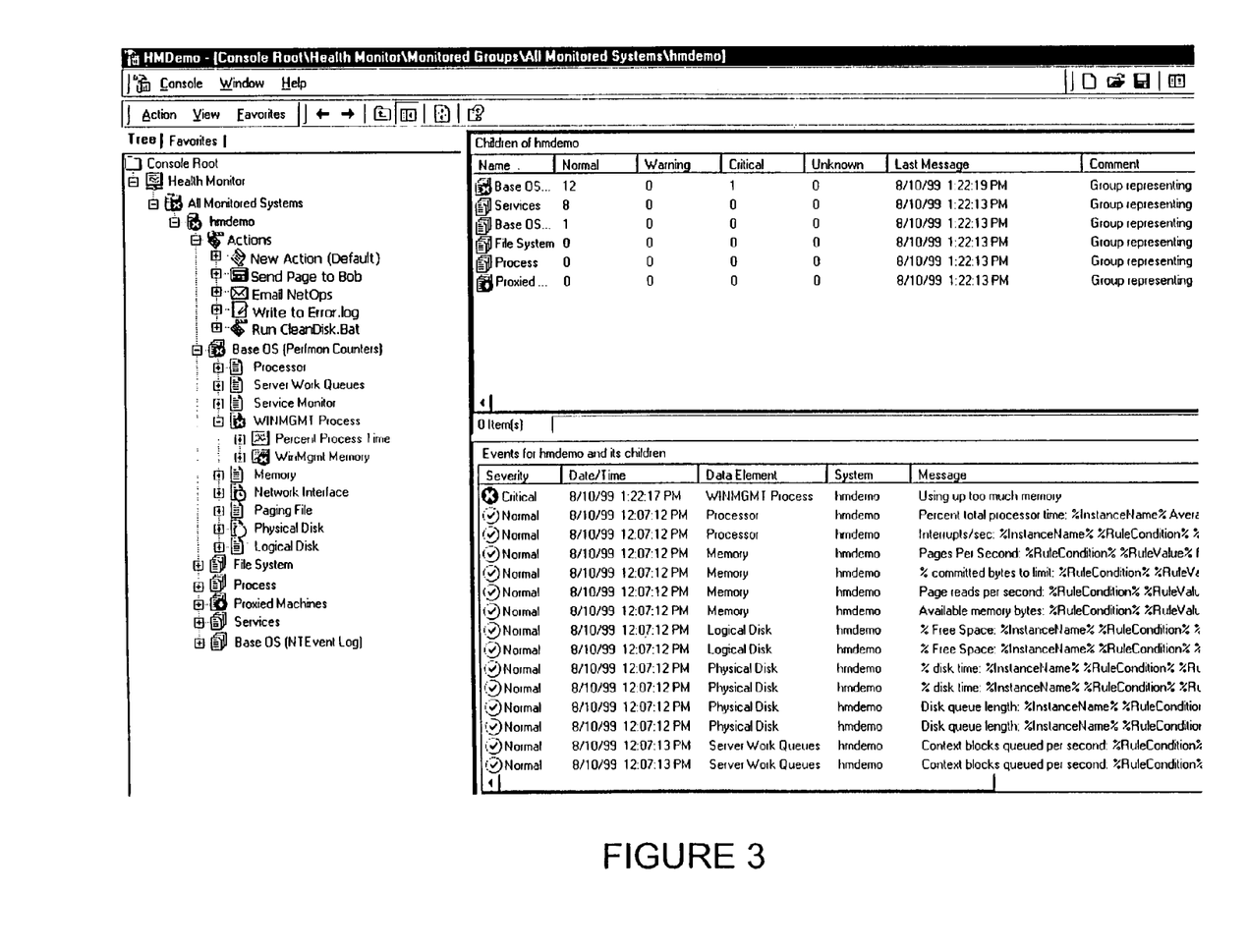
FIG. 3 is an exemplary embodiment of the system and method of the invention illustrating selections of windows in monitoring software.

As a specific example, refer to FIG. 3. Suppose the lower right object window is changed by the user into a memory mode. Such a change would result in the scope window on the left to change focus from hmdemo to Memory.

The linkage between the primary display windows 204, 206, 208 and the scope window 202 may be defined by an application developer. As a result, parameters are passed from the scope window 202 to the primary display windows and the passed parameters are used in a query to control the display of the primary display windows. Alternatively, the linkage between the primary display windows 204, 206, 208 and the scope window 202 may be defined or modified by the user so that the parameters are passed according to user instructions. The query operates on a database to display a selected set of the first primary objects in the first primary window. In one embodiment, multiple queries operating on varying data sources to return a results set or other output events to display in the display windows 204, 206, 208, 210, 212, 214. As a minimum, the scope window 202, the first primary display window 204 and the second primary display window 206 form a work space view. The other windows may optionally be part of the work space view. This work space view may be saved as a local view on a local drive by the user. Alternatively, this work space view may be saved as a global view in a database shared by multiple users in which case either a user or an administrator may initiate availability of the work space view on the shared database.

In one embodiment, the invention constitutes linking child windows which display objects linked to items selected in a parent window. For example, the user is allowed to select at least one displayed scope item 218 in the scope window 202. As a result, the first primary objects of the first primary display window 204 are linked to the selected scope item 218. In addition, the second primary objects of the second primary display window 206 may be linked to the same selected scope item 218 or a different selected item. In the event that a third primary display window 208 is created, the third primary objects are linked to the selected scope item 218 as well.

This linking carries forth to the subsequent levels of the split tree navigation according to the invention. For example, the user is permitted to select a first primary object 220 in the first primary display window 204 so that the first secondary objects of the first secondary display window 210 are linked to the selected first primary object 220. In addition, the second secondary objects of the second secondary display window 212 may be linked to the same selected first primary object 220 or a different selected object. In addition, if a third secondary display window is created, the third secondary objects may be linked to the same selected first primary display object 220 or a different selected object.

Another optional feature of this particular configuration is the linking back of windows to the scope window. Even in the configuration shown in FIG. 2, the first secondary objects (1–Q) of the first secondary display window 210 may be linked back to the select scope items 218 in the scope window 204 as indicated by arrow 216.

Looking to FIG. 2 again, it can be seen that the invention accomplishes the advantages noted above. In particular, selection of a scope item 218 in the scope window 202 drives the contents of the primary display windows 204, 206, 208. As a result, this has the advantage of allowing for more than one summary window, such as a table of data, a performance graph, an events list, a list control, a topological view, a text window or other window. In one embodiment, one or more window types are defined. Each of the windows in the workspace view are associated with one of the window types. For example, the scope window 202, the first primary display window 204, and second primary display window 206 are associated with one of the window types. The window types include one or more of the following: a table, a graph, a list, a list control, a topological view, and a text window. In one embodiment, the invention allows the user to convert the scope window 202, the first primary display window 204, the second primary display window 206, or any other window from one window type to another window type, such as by right-clicking in the window to be changed.

It is also contemplated that each window created may include data driven from a query and that the type of window is determined by the type of driven data. Thus, the invention includes a computer readable medium having computer-executable instructions for performing steps comprising:

forming a scope window displaying scope items therein;

forming a first primary display window displaying first primary objects linked to the scope window; and forming a second primary display window displaying second primary objects linked to the scope window; and defining window types of the first primary display window and of the second primary display window as a function of data driven from a query, wherein the type of driven data determines the window type.

In this embodiment, the user is allow to convert the scope window, the first primary display window, and/or second primary display window from one window type to another window type. The window types include one or more of the following: a table, a graph, a list, a list control, a topological view, and a text window.

As another example, in monitoring software, the scope window outlines summary information about the children of the selected scope item while the primary window displays the consolidated event store for the selected object. An additional window that displays real time performance graph information on the selected scope item 218 or HTML reports on the select item could also be displayed as a separate primary window. Therefore, one aspect of the invention is that more than one primary window is driven off the scope window. In the illustration in FIG. 2, primary windows 204, 206 and 208 are driven off the scope window 202.

Another advantage which the invention achieves is that the selection of an item such as a first primary object 220 in the first primary display window 204 can then drive other windows outside the scope of the first primary display window 204. In particular, item 220 as noted above may be used to drive the secondary windows 210, 212, 214. As an example, selection of an event within a primary event display window could then drive additional secondary windows that outline how to troubleshoot that specific event or could drive windows that show more detailed information about the event by looking up data in a database. This leads to another advantage of the invention in that the administrator can link back to the scope window 202 that is driving the first primary display window 204. As an example, double clicking on an entry in the first secondary display window 210 could change the focus in the scope window 202 allowing the user to drill down through a hierarchy of entries.

Another advantage of the invention which is achieved is flexibility. Users can create a new window and the newly created window can be a specific type, such as a graph view, list view, document window, HTML browser, node view, etc. Linkage between the created window and other windows can be defined by the application developer, or defined or modified by the user to pass parameters to the window for a query that is returned to the window for display. For example, selecting a number in one window could search for that number like an event ID in another window. Querying data out of a totally separate database of information that is then displayed in the new window is one way of achieving this. Other achievable advantages include the fact that the location of any window on the screen is configurable by the user so that the user can organize the data in the most efficient manner. In addition, as noted above, once configured, the work space view can then be saved as either a local view saved to the local hard disk or can be saved as a global view in an SQL database or share point where others can access it as a new view. In addition, the work space can be emailed to others.

FIG. 3 is an example of the selection process according to the invention. By selecting hmdemo in the scope window on the left, the work space view shows summary information (children of hmdemo) in the top right pane and the alerts on hmdemo in the bottom right pane (events for hmdemo and its children). When a user double clicks on a child in the top right pane, it changes the focus to the child in the scope window on the left and then redisplays the children in the top right pane and the events displayed in the bottom right pane. The events window at the bottom right pane only displays the alerts/events for the selected object in the scope tree of the scope window and the alerts/events for all children of the selected scope item. As another example in a monitoring application, the top right pane may outline summary information about the children of the selected scope item in the left pane while the bottom right pane displays the consolidated event store for the selected scope item in the left pane. An additional, primary window (not shown in FIG. 3) may display a real time performance graph of information related to the selected scope item or HTML reports on the selected scope item could also be displayed. In any case, more than one primary window is independently driven off of the selected scope item.

In another form, the invention comprises a computer-readable medium having stored thereon a data structure. The data structure includes the scope window 202 displaying scope items 1–N including an item 218 selected by the user. In addition, the data structure comprises the first primary display window 204 for displaying first primary objects 1–M which are linked to the selected scope item 218. In addition, the data structure includes a second primary display window 206 for displaying second primary objects 1–M' linked to the selected scope item 218. As noted above, the second primary objects 1–M are independent of the first primary objects 1–M' in this data structure configuration.

It is also contemplated that the invention may be implemented as a graphical user interface (GUI) including a display and a user interface selection device. In this configuration, the GUI would first form the scope window 202. Thereafter, scope items 1–N would be retrieved from a database for display in the scope window 202. Next, a first primary display window 204 would be formed and first primary objects 1–M would be retrieved from a database. The first primary objects 1–M would be linked to the scope window and/or its selected item and would be displayed in the first primary display window 204. Next, a second primary display window 206 is formed by the GUI and the second primary objects 1–M' which are linked to the scope window 202 are displayed in the second primary display window 206. Once again, as noted above, the second primary objects 1–M' are independent of the first primary objects 1–M. In a particular configuration of the graphical user interface, a user may select at least one displayed scope item such as item 218. As a result, the retrieved first primary objects 1–M would be linked to the selected scope item 218 and displayed in the first primary display window 204. In addition, the retrieved second primary objects 1–M' would be linked to the selected scope item 218 and would be displayed in the second primary display window 206.

In another form, the invention constitutes a method of allowing a user or an administrator to define windows in a multi-tree navigation configuration. Initially, the scope window 202 is formed displaying scope items therein in response to instructions from the user or administrator. The method allows the user to select at least one displayed scope item such as item 218. This results in the first display window 204 displaying first primary objects 1–M which are linked to the selected scope item 218 in accordance with the instructions from the user or administrator which originally set up the configuration. In addition, the second display window 206 displays second primary objects 1–M' which are linked to the selected scope item 218 in accordance with instructions from the user or administrator. As noted above, the second primary objects 1–M' are independent of the first primary objects 1–M.

Monitoring Software Example

The following is an example of an implementation of the invention as part of a monitoring software application. The result pane may be an ActiveX control that is a control container which hosts two other OCX controls (object linking and embedding custom control). The ActiveX control is known as the split pane control and will host two different enhanced list controls. The split pane control has only two windows separated by a horizontal splitter bar. The splitter bar may be selected by the left mouse and moved up or down within the control. It has two control windows, the upper result window and the lower result window. The default location for the splitter control is near the center of the result pane and the user may then move it up or down to any location that is desired. This location persists regardless of what is selected in the scope pane.

For example, in monitoring software, the upper result window is used as the standard result pane that may change based on the container selected. The lower result may be an enhanced list control and will contain filtered events based on the scope pane selection. The upper result window may be known as a "details pane" as it displays detailed information about the children displayed. This window may be used to show associations in the event that the container has no children. The lower result window may be known as an "alert pane" as it displays console alerts for the selected object in the scope and all of the selected objects' children. This helps the administrator and/or user and provides one method for filtering events based on scope item selection.

Each result pane will have a title band over each list control. This title band will indicate focus to the user. The detail pane will list "children of <scope selected container>" while the alert pane will list "events for <scope selected container> and its children." Each title band will include a progress bar and details of that progress, if necessary. Upon initial selection of a new scope pane object, the alert pane will display events filtered on the selected object and events for the selected objects' children.

Selection in the details pane does not drive the filter of the alert pane. This is different than the prior model of similar systems which never show the children in the scope (email messages). The details pane of monitoring software, for example, will show the children of the selection and the alert pane will show the events for the selection. This behavior should be the same everywhere within the product.

Alert Pane Window

In the case of monitoring software, an alert pane may display events filtered on the selected object and events for the selected objects' children. The scope of pane selection may drive the autofiltering of the alert pane. In this case, the results pane of any alert pane provides the following:

TABLE 1

All Containers - Table Columns

| COLUMN NAME | DESCRIPTION | Default WIDTH (pixels) | Default VALUE | TYPE |
|---|---|---|---|---|
| (Icon) | Severity Icon | Icon | Unknown | Icon |
| Severity | This is the severity of the message | 12 | N/A | Text |
| ID | The Message ID of the event | 6 | N/A | Integer |
| Date/Time | Date and Time that the event was generated and formatted per local time settings | 20 | N/A | Date/Time |
| Data collector | The data collector that generated the message | 20 | N/A | Text |
| Computer | Name of the Monitored Computer that the event came from | 12 | N/A | Text |
| Message | The message text for the alert | Remaining or Min 30 | N/A | Text |

When the console alert pane window is selected in the results pane, the action menu may present the following non-container focused commands:

TABLE 2

| ITEM | ACTION |
|---|---|
| Cut | Cut the selected message(s) |
| Copy | Copy the selected message(s) |
| Clear | Clear the selected message(s) |
| Refresh | Issue the Refresh command |
| Help | Issues the help command |

For other respects, the functionality of the alert pane may be the same as the common list control for the details pane. Details of specific details panes are outlined under the container that is selected.

Statistics Tab

Monitoring software may have several tabs in the upper details pane including SUMMARY, STATISTICS, and GRAPH. Each SUMMARY view will be outlined under the specific container throughout the specification. However, the STATISTICS tab is very similar to the status pane in that what is viewed is simply driven off of the user scope pane selection. This view may be modeled as a task manager.

The data collectors displayed will be those data collectors for the selected container and its children. This applies to the threshold (where it shows only the data collector and property/instance used by the threshold), to the computer container (where it shows all the data collectors currently configured on the given system) and to other similar collectors. For containers that have no STATISTICS tabs such as System Groups, the user may see a message within the statistics pane saying "statistics are only available on a per computer basis. Please select a computer to display statistics" (or similar message).

The results pane of any STATISTICS pane may be as follows:

TABLE 3

All Containers - Table Columns

| COLUMN NAME | DESCRIPTION | Default WIDTH (pixels) | Default VALUE | TYPE |
|---|---|---|---|---|
| Data collector | This is the name of the data collector as outlined in the name field | 12 | N/A | Text |
| Property | This is the name of the property of the data collector. | 12 | N/A | Text |
| Instance | This is the name of the instance provided from WMI. Some values may show "N/A" if they have no instances. | 12 | N/A | Text |
| Current | This is the current value of the data collector since the last update. In the event that it is a string value, only the string value will be shown. No minimum, maximum or average is calculated. | 12 | N/A | Integer |
| Minimum | This is the minimum value as returned from the agent statistics since the last update. | 12 | N/A | Integer |

TABLE 3-continued

All Containers - Table Columns

| COLUMN NAME | DESCRIPTION | Default WIDTH (pixels) | Default VALUE | TYPE |
|---|---|---|---|---|
| Maximum | This is the maximum value as returned from the agent statistics since the last update. | 12 | N/A | Integer |
| Average | This is the average value as returned from the agent statistics since the last update. | 12 | N/A | Integer |
| Last Update | The message text for the alert | Remaining or Min 30 | N/A | Text |

When the STATISTICS pane is selected, the action menu may present the following non-container focused commands:

TABLE 4

| ITEM | ACTION |
|---|---|
| Copy | Copy the selected message(s) |
| Refresh | Issue the Refresh command |
| Help | Issues the help command |

For other respects, the functionality of these STATISTICS pane is the same as the common list control for the details pane. Details of specific details panes are outlined under the container that is selected.

Common List Control Within the Split Pane Control

The common list control is an OCX (object linking and embedding custom control) that is hosted within the split pane control. This may be implemented as two separate controls. This section describes operations of the common list control used within monitoring software. The common list control may support the details view by default. This view is similar to the details view and contains column information for each entry in the zero column (or name column).

The other views for icon view, small icon view and list view may be implemented at the developer's discretion. These options may also include the choice of options in the right click options menu in the header of the list control. Only the details view is required.

The common list control may support the following requirements for columns within the list control:

| | |
|---|---|
| Default Values: | The list control is first displayed when a scope pane entry is selected; the name (or zero) column will consist of children of the scope selection. All sorting and filtering will be cleared. The data selection will be the first entry in the data list at the top of the list control. The ordering of the child data will be sorted alphabetically independent of whether if the scope tree is sorted or not. |
| Formatting: | The list control will use the Default System Font for data within the control. The font may be changed through options. Time and dates displayed as data within the columns will use the regional settings as set in the control panel of the local machine on which the monitoring application is running. |
| Data Linking: | Data within the columns will be driven off of the selection within the scope pane. |
| Column Labels: | Column text label positioning, column width, column name and data default values are outlined below under each scope entry selection. |
| Auto Resizing: | When the administrator moves the cursor to the right most boundary of a column, they will be given the "auto resizing cursor". When the administrator double clicks with this cursor, the list control will change the width of the column to the longest entry within the column. |
| Tool Tip Support: | Data entries within the columns will support windows tool tips to display the remaining data within the column if it does not fit within the columns width. This tool tip will extend out of the right side of the column over any existing window boundary as left justified unless the tool tip hits the right side of the screen. Upon hitting the right screen boundary, the tool tip will be right justified. In the event that the data is more than 80 characters, the tool tip will implement multi line tool tips where each line is a maximum of 80 characters per line or until a CRLF is entered for that line. Up to 25 lines of text can be displayed this way. All remaining text is cut from the tool tip. |
| Scroll Bars: | The list control will support horizontal and vertical scroll bars in the event that the data to be displayed extends beyond the window boundary. |
| Label Editing: | If the administrator "slow" double clicks the name column (the one that matches in the scope pane) then label editing will be activated. This is the same functionality as is supported in the scope tree to rename a scope pane entry such as Server Name, Group Name, Data Group Name or Data collector Name. |
| Color: | Color of text, columns, etc. are all set via the color settings. |

The list control may support minimal arranging functionality within the control, including:

| | |
|---|---|
| Column Arranging: | All columns may be selected and "dragged" to a new position within the control. This allows the administrator to customize the ordering to his or her own specific task needs. These column positions will be saved upon proper exit of the monitoring application so that when the administrator views that control again, it will be consistent. Column ordering may be different depending on the scope item type that is selected. For example, the column ordering for "Computer groups", "Monitored Computers", "Data Groups" and "Data collectors" may be different but selecting a different entry of the same type will give the administrator the same column ordering (one Data collector to another for example). |
| Right Click Options Menu: | When the administrator right clicks on the column header of the control, they are presented with a drop down listing of options for the control. |

The following options may be listed within this drop down list and are separated by a line separator. They may be presented in this order:
[View Options]
[Filter Options]
[List of columns in the control and with checks for those active]
For example, for the Computer Scope:

| View | |
|---|---|
| ✓ | Details |
| | Icons |
| ✓ | Filter Control |
| ✓ | Name |
| ✓ | Normal |
| ✓ | Warning |
| | Critical |
| | Unknown |
| ✓ | Last Alert |
| | Comment |

The check marks show which features (columns or filter control) are visible and which ones are hidden.

When the administrator selects a column header, sorting of the column is activated. Single left clicking a column creates a DOWN triangle at the right side of the header label bar and sorts that column ascending (alphabetic for letters, numerically for numbers and by date for date fields). Single left clicking a column header label a second time creates an UP triangle at the right side of the header label bar and clicking a third time turns off sorting of that column.

If the administrator single left clicks any other column header, all sorting is turned off for all columns before the new column activates the DOWN triangle and sorts ascending.

The list control supports multiple columns in sort mode at any given time. No more than two columns are needed but a developer may make the decision to do more than two. This is not a requirement. If one column has sorting activated then the administrator can SHIFT left click a second column to activate sorting of the second column. The new column gets a DOWN triangle as that column is sorted ascending within the primary sort order list.

For example, if the date column has been sorted ascending then in a second column the administrator may SHIFT left select the "name" column. In this example, for each date that is the same, there may be several names. For all names with the same date, those names will be sorted ascending and the date column will have an upward triangle and the name column will have an upward triangle.

The list control may support the extension for "quick" filtering of a column. This option allows the administrator to select a minimum set of functions for reducing the list of data within a column and allows them to simply type text in the filter window as the filter criteria. Although the administrator can turn this on in the "list control options" menu, it is off by default in the list controls. Column filtering is not saved into the console file and reloaded upon startup.

Figure 4:
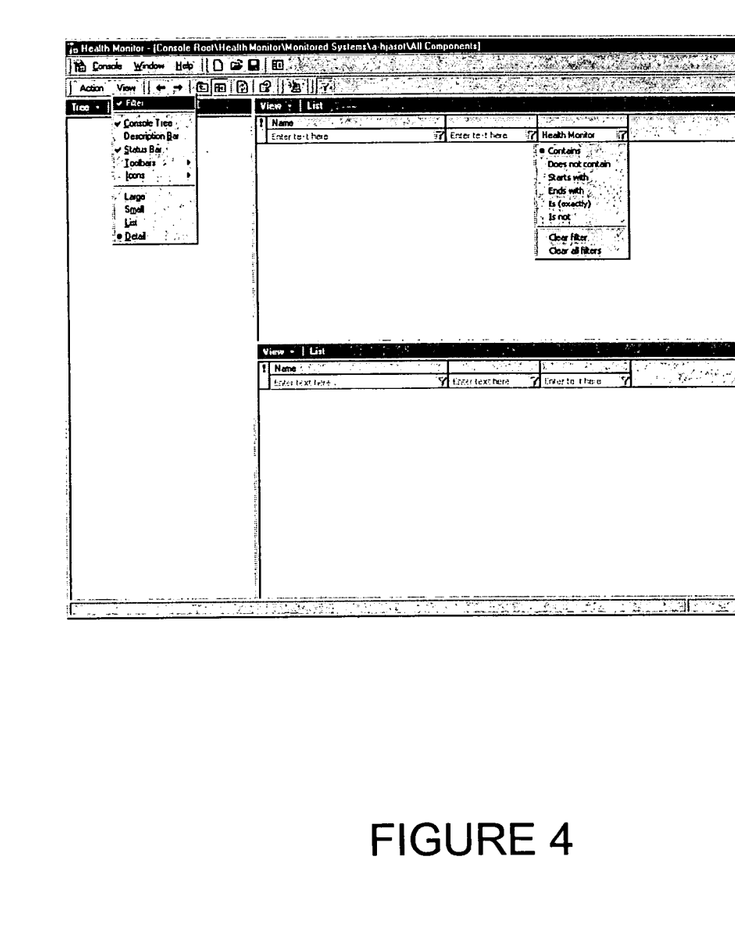
FIG. 4 is an exemplary embodiment of the system and method of the invention illustrating multiple windows in monitoring software.

FIG. 4 illustrates a screen slot for filter presentation of multiple windows according to the invention.

The "Quick" filter control may support the following options for string values within filter control:
Contains the text
Does not contain the text
Starts with
Ends with
Is (Exactly)
Is Not
Clear filter (only this one)
Clear all filters The "Quick" filter control will support the following options for numeric and date values within filter control:

| |
|---|
| Is less than |
| Is greater than |
| Is equal to |
| Is greater than or equal to |
| Is less than or equal to |
| Is (Exactly) |
| Is Not |
| Clear filter (only this one) |
| Clear all filters |

FIGS. 3 and 4 also illustrate another independent aspect of the invention. In particular, it is preferable that the scope, primary and/or secondary windows have edges which are docked to each other so that there is no overlap of windows and so that one window does not obstruct the view of any other windows. Although the user may configure windows to be overlapping, it would be preferable that the edge of each window frame be docked to the edge of an adjacent window. For example, if two vertical edges are docked to each other, increasing the horizontal size of one window will necessarily decrease the horizontal size of the adjacent window. One primary benefit of this configuration is that it minimizes the risk of a user losing track of which window is the scope window and which windows are the primary and secondary windows linked to the scope window. In a more general form, this aspect of the invention includes computer readable medium having stored thereon a data structure, comprising a scope window displaying scope items therein and allowing a user to select at least one displayed scope item. A first primary display window displays first primary objects linked to the scope window and has an edge adjacent an edge of the scope window. A second primary display window displays second primary objects linked to the scope window and has an edge adjacent to an edge of the scope window or an edge of the primary window. The adjacent edges are docked to each other so that movement of one adjacent edge causes movement of the other adjacent edge.

Although described in connection with an exemplary monitoring application and an exemplary computing system environment, including computer 130, the invention is operational with numerous other general purpose or special purpose computing system environments or configurations. The monitoring application and/or computing system environment is not intended to suggest any limitation as to the scope of use or functionality of the invention. Moreover, the application and environment should not be interpreted as having any dependency or requirement relating to any one or combination of components illustrated in the application and the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like. Examples of other applications in which the invention may be implemented include any database analysis or presentation application.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

The invention claimed is:

1. A computer storage medium having computer-executable instructions for performing a method comprising:
   forming a scope window displaying in a hierarchical structure a plurality of scope items therein;
   allowing a user to select a particular displayed scope item in the scope window;
   receiving from a user and/or an administrator a first set of instructions changing content of the particular selected scope item by defining one or more first primary objects to be displayed in a first primary display window;
   forming the first primary display window in response to the particular selected scope item and in response to the first set of instructions for displaying the one or more first primary objects in the first primary display window, said first primary display window being different from said scope window;
   receiving from the user and/or administrator a second set of instructions changing the content of the particular selected scope item by defining one or more second primary objects to be displayed in a second primary display window, wherein the first set of instructions is independent of the second set of instructions so that the one or more first primary objects displayed in the first primary display window are independent of the one or more second primary objects displayed in the second primary display window;
   forming the second primary display window in response to the particular selected scope item and in response to the second set of instructions for displaying the one or more second primary objects in the second primary display window, said second primary display window being different from said scope window and said first primary display window; and
   linking the first primary objects to the scope window independently of the second primary objects to the scope window, and wherein the scope window persists displaying scope items in the scope window after the forming of the first primary display window and the second primary display window.

2. The computer storage medium of claim 1, having further computer-executable instructions for receiving from the user and/or administrator a third set of instructions changing the content of the particular selected scope item by defining one or more third primary objects to be displayed in a third primary display window, said third set of instructions being independent of the first set of instructions and the second set of instructions and for performing the step of forming the third primary display window in response to the particular selected scope item and in response to the third set of instructions for displaying third primary objects linked to the scope window wherein the third primary objects are independent of the first primary objects and wherein the third primary objects are independent of the second primary objects, wherein said third primary display window being different from the scope window, the first primary display window, and the second primary display window.

3. The computer storage medium of claim 1, having further computer-executable instructions for:
   allowing a user to select at least one of the displayed first primary objects in the first primary display window;
   forming a first secondary display window in response to the selected first primary object for displaying first secondary objects which are dynamically linked to the first primary display window, said first secondary display window being different from the first primary display window; and
   forming a second secondary display window in response to the selected first primary object for displaying second secondary objects which are dynamically linked to the first primary display window wherein the second secondary objects are independent of the first secondary objects, said second secondary display window being different from the first primary display window and the first secondary display window.

4. The computer storage medium of claim 3, having further computer-executable instructions for forming a third secondary display window in response to the selected first primary object for displaying third secondary objects which are dynamically linked to the first primary display window wherein the third secondary objects are independent of the first secondary objects and wherein the third secondary objects are independent of the second secondary objects, wherein said third secondary display window being different from first primary display window, the first secondary display window, and the second secondary display window.

5. The computer storage medium of claim 1, having further computer-executable instructions for:
   forming a first secondary display window displaying first secondary objects linked to the first primary display window, wherein the scope window displays and focuses on a selected one of the displayed first secondary objects; and
   dynamically linking the first secondary display window to the scope window so that a command or selection in the first secondary display window changes the focus or content of the scope window, said first secondary display window being different from the scope window and the first primary display window.

6. The computer storage medium of claim 1, wherein linking comprises linking being defined by an application developer or a user so that parameters are passed from the scope window to the first primary display window and wherein the passed parameters are used in a query to provide data to the first primary display window which determines how it will be displayed.

7. The computer storage medium of claim 6, wherein the query operates on a database to display a selected set of the first primary objects in the first primary display window.

8. The computer storage medium of claim 1, wherein the scope window, the first primary display window and the second primary display window form a workspace view which is saved either as a local view on a local drive or as a global view in a database shared by multiple users.

9. The computer storage medium of claim 1, wherein allowing a user to select at least one displayed scope item in the scope window, having further computer-executable instructions for:
   linking independently the first primary objects to the selected scope item; and
   linking independently the second primary objects to the selected scope item.

10. The computer storage medium of claim 9, having further computer-executable instructions for forming a third primary display window displaying third primary objects linked to the selected scope item wherein the third primary objects are independent of the first primary objects and wherein the third primary objects are independent of the second primary objects.

11. The computer storage medium of claim 9, having further computer-executable instructions for:
   allowing a user to select at least one first primary object in the first primary display window;
   forming a first secondary display window displaying first secondary objects linked to the selected first primary object, said first secondary display window being different from the first primary display window; and
   forming a second secondary display window displaying second secondary objects linked to the selected first primary object wherein the second secondary objects are independent of the first secondary objects said second secondary display window being different from said first primary display window, and the first secondary display window.

12. The computer storage medium of claim 11, having further computer-executable instructions for forming a third secondary display window displaying third secondary objects linked to the selected first primary object wherein the third secondary objects are independent of the first secondary objects and wherein the third secondary objects are independent of the second secondary objects.

13. The computer storage medium of claim 11 wherein the user selects at least one first primary object in the first display window, and said computer storage medium having further computer-executable instructions for:
   forming a first secondary display window displaying first secondary objects linked to the selected first primary object; and
   linking the first secondary display window to the scope window so that the first secondary objects displayed in the first secondary display window are linked to the selected scope item in the scope window.

14. The computer storage medium of claim 1, having further computer-executable instructions for defining window types, wherein the scope window, the first primary display window, and second primary display window are associated with one of the window types.

15. The computer storage medium of claim 14, wherein the window types include one or more of the following: a table, a graph, a list, a list control, a topological view, and a text window.

16. The computer storage medium of claim 15, having further computer-executable instructions for allowing a user to convert one or more of the following from one of the window types to another of the window types:
   the scope window;
   the first primary display window; and
   the second primary display window.

17. The computer storage medium of claim 1, having further computer-executable instructions for performing the step of defining window types as a function of data driven from a query, wherein the type of driven data determines the window type.

18. A computer storage medium having stored thereon a data structure, comprising:
   a scope window displaying in a hierarchical structure a plurality of scope items therein and allowing a user to select a particular displayed scope item;
   a first primary display window displaying one or more first primary objects which are dynamically linked to the particular selected scope item as defined by a first set of instructions specified by the user, said first set of instructions changes the content of the particular selected scope item, said scope window being different from said first primary display window; and
   a second primary display window displaying one or more second primary objects which are dynamically linked to the particular selected scope item as defined by a second set of instructions specified by the user, said second set of instructions changes the content of the particular selected scope item, wherein the first set of instructions is independent of the second set of instructions so that linking the second primary objects to the selected scope items is independent of linking the first primary objects to the particular selected scope item, and wherein the scope window persists displaying scope items in the scope window after forming the first primary display window and the second primary display window, said second primary display window being different from said scope window and said first primary display window.

19. The computer storage medium of claim 18 wherein the user selects at least one first primary object in the first primary display window and further comprising:
   a first secondary display window displaying first secondary objects linked to the selected first primary object, said first secondary display window being different from the first primary display window; and a second secondary display window displaying second secondary objects linked to the selected first primary object wherein linking the second secondary objects to the selected first primary object is independent of linking between the first secondary objects to the selected first primary object, said second secondary display window being different from the second primary display window and the first secondary display window.

20. The computer storage medium of claim 18 wherein the user selects at least one first primary object in the first primary display window and further comprising:

a first secondary display window displaying first secondary objects linked to the first primary display window and linked to the scope window, said first secondary display window being different from the first primary display window and the scope window.

21. In a computer system having a graphical user interface including a display and a user interface selection device, a method of providing a display comprising:

forming a scope window;

retrieving scope items for display in a hierarchical structure in the scope window;

allowing a user to select a particular scope item in the scope window;

receiving from the user a first set of instructions for changing the content of the particular selected scope item by defining one or more first primary objects to be displayed in a first primary display window;

forming the first primary display window in response to the particular selected scope item, said first primary display window being different from said scope window;

retrieving first primary objects, in response to the first set of instructions, which are dynamically linked to the scope window for display in the first primary display window;

receiving from the user a second set of instructions for changing the content of the selected scope item by defining one or more second primary objects to be displayed in a second primary display window;

forming the second primary display window in response to the particular selected scope item, said second primary display window being different from said scope window and said first primary display window; and retrieving second primary objects, in response to the second set of instructions, which are dynamically linked to the scope window for display in the second primary display window wherein the first set of instructions is independent of the second set of instructions and the second primary objects are independent of the first primary objects, and wherein the scope window persists displaying scope items in the scope window after forming the first primary display window and the second primary display window.

22. The method of claim 21, further comprising:

linking the retrieved first primary objects to the selected scope item to be displayed in the first display window;

linking the retrieved second primary objects to the selected scope item to be displayed in the second primary display window; and wherein linking the retrieved first primary objects to the selected scope item is independent from linking the retrieved second primary objects to the selected scope item.

23. The method of claim 21 further comprising the step of forming a third primary display window displaying third primary objects linked to the scope window wherein the third primary objects are independent of the first primary objects and wherein the third primary objects are independent of the second primary objects, wherein said third primary display window being different from the scope window, the first primary display window, and the second primary display window.

24. The method of claim 21 further comprising the steps of:

allowing a user to select at least one of the displayed first primary objects in the first primary display window;

forming a first secondary display window displaying first secondary objects linked to the first primary display window, said first secondary display window being different from the first primary display window; and forming a second secondary display window displaying second secondary objects linked to the first primary display window wherein the second secondary objects are independent of the first secondary objects, said second secondary display window being different from the first primary display window and the first secondary display window.

25. The method of claim 24 further comprising the step of forming a third secondary display window displaying third secondary objects linked to the first primary display window wherein the third secondary objects are independent of the first secondary objects and wherein the third secondary objects are independent of the second secondary objects, said third secondary display window being different from the first primary display window and the first secondary display window.

26. The method of claim 21 further comprising the steps of:

forming a first secondary display window displaying first secondary objects linked to the first primary display window; and linking the first secondary display window to the scope window, said first secondary display window being different from the first primary display window and the scope window.

27. A computer system having a graphical user interface including a display and a user interface selection device, said system comprising:

means for retrieving scope items in response to administrator and/or user input;

means for displaying the retrieved scope items in a scope window;

means for receiving from a user a first set of instructions for changing the content of the retrieved scope item by defining first primary objects to be displayed in a first primary display window and for receiving from the user a second set of instructions for changing the content of the retrieved scope item by defining second primary objects to be displayed in a second primary display window, said first primary display window being different from said scope window;

means for retrieving first primary objects linked to the scope window in response to administrator and/or user input and in response to the first set of instructions;

means for displaying the retrieved first primary objects in the first primary display window;

means for retrieving second primary objects linked to the scope window in response to administrator and/or user input and in response to the second set of instructions such that linking the second primary objects to the scope window is independent of linking the first primary objects to the scope window; and means for displaying the retrieved second primary objects in the second primary display window, said second primary display window being different from said scope window and said first primary display window.

28. A method of allowing a user or an administrator to define windows comprising the steps of:
   forming a scope window displaying in a hierarchical structure scope items therein in response to instructions from the user or administrator;
   allowing a user to select a particular displayed scope item;
   forming a first primary display window displaying first primary objects, said first primary display window being different from said scope window;
   dynamically linking the first primary objects to the particular selected scope item in accordance with a first set of instructions from the user or administrator, said first set of instructions from the user or administrator changing the content of the particular selected scope item by defining the display of first primary objects in the first primary display window;
   forming a second primary display window displaying second primary objects, said second primary display window being different from said scope window and said first primary display window; and
   dynamically linking the second primary objects to the particular selected scope item in accordance with a second set of instructions from the user or administrator wherein the step of linking the second primary objects is independent of the step of linking the first primary objects, said first set of instructions and said second set of instructions from the user or administrator changing the content of the particular selected scope item by defining the display of second primary objects in the second primary display window, and wherein the scope window persists displaying scope items in the scope window after forming the first primary display window and the second primary display window.

29. The method of claim 28 wherein the step of linking the first primary objects to the scope window is defined by an application developer or a user so that parameters are passed from the scope window to the first primary display window and wherein the passed parameters are used in a query to control the display of the first primary objects in the first primary display window.

30. The method of claim 28 wherein the scope window, the first primary display window and the second primary display window form a workspace view which is saved either as a local view on a local drive or as a global view in a database shared by multiple users.

31. The method of claim 28 further comprising allowing a user to select at least one displayed scope item in the scope window, wherein the first primary objects are linked to the selected scope item, wherein the second primary objects are linked to the selected scope item, and wherein the step of linking the first primary objects to the selected scope item is independent of the step of linking the second primary objects to the selected scope item.

32. The method of claim 31 wherein the user selects at least one first primary object in the first primary display window and further performing the steps comprising:
   forming a first secondary display window displaying first secondary objects linked to the selected first primary object, said first secondary display window being different from the first primary display window; and
   forming a second secondary display window displaying second secondary objects linked to the selected first primary object wherein the second secondary objects are independent of the first secondary objects, said second secondary display window being different from the first primary display window and the first secondary display window.

33. The method of claim 32 further performing the step comprising forming a third secondary display window displaying third secondary objects linked to the selected first primary object wherein the third secondary objects are independent of the first secondary objects and wherein the third secondary objects are independent of the second secondary objects, wherein said third secondary display window being different from the first secondary display window and the second secondary display window.

34. The method of claim 31 wherein the user selects at least one first primary object in the first primary display window and further performing the steps comprising:
   forming a first secondary display window displaying first secondary objects linked to the selected first primary object; and
   linking the first secondary display window to the scope window so that the first secondary objects displayed in the first secondary display window are linked to the selected scope item in the scope window, said first secondary display window being different from the first primary display window.

35. A computer system having a graphical user interface including a display and a user interface selection device, said system comprising:
   means for displaying a scope window;
   means for permitting a user to select a particular item in the scope window;
   means for displaying a first primary display window, said first primary display window being different from said scope window;
   means for displaying a second primary display window, said second primary display window being different from said scope window and said first primary display window;
   means for receiving from the user a first set of instructions for changing the content of the particular selected item by defining first primary objects to be displayed in the first primary display window and for receiving from the user a second set of instructions for changing the content of the particular selected item by defining second primary objects to be displayed in the second primary display window;
   means for linking the first primary objects in the first primary display window to the scope window in response to the selected item by the user and in response to the first set of instructions; and
   means for linking the second primary objects in the second primary display window to the scope window in response to the particular selected item by the user and in response to the second set of instructions, wherein the means for linking the first primary objects in the first primary display window to the scope window is independent of the means for linking the second primary objects in the second primary display window to the scope window, and wherein the means for displaying the scope window persists displaying scope items in the scope window after the first primary display window and the second primary display window are displayed.

36. The system of claim 35 further comprising:
   means for displaying a first secondary display window, said first secondary display window being different from the first primary display window;

means for permitting a user to select an item in the first primary display window;
means for linking the first secondary display window to the first primary display window in response to the selected item by the user;
means for displaying a second secondary display window, said second secondary display window being different from the first primary display window and the first secondary display window; and
means for linking the second secondary display window to the first primary display window in response to the selected item by the user, wherein the means for linking the first secondary display window to the first primary display window is independent of the means for linking the second secondary display window to the first primary display window.

37. The system of claim 35 further comprising:
means for displaying a first secondary display window;
means for linking the first secondary display window to the first primary display window; and
means for linking the first secondary display window to the scope window.

38. The system of claim 35 wherein means for linking the second primary display window to the scope window comprises means for linking the second primary display window to the scope window in response to the particular selected item.

39. A computer system having a graphical user interface including a display and a user interface selection device, said system comprising:
means for displaying a scope window;
means for permitting a user to select a particular item in the scope window;
means for displaying a first primary display window, said first primary display window being different from said scope window;
means for displaying a second primary display window, said second primary display window being different from said scope window and said first primary display window;
means for receiving from the user a first set of instructions for changing the content of the particular selected item by defining first primary objects to be displayed in the first primary display window and for receiving from the user a second set of instructions for changing the content of the particular selected item by defining second primary objects to be displayed in the second primary display window;
means for driving the first primary objects in the first primary display window off of the particular selected item in the scope window and based on the first set of instructions; and
means for driving the second primary objects in the second primary display window off of the particular selected item in the scope window and based on the second set of instructions, wherein the means for driving the first primary objects in the first primary window is independent of the means for driving the second primary objects in the second primary display window, and wherein the means for displaying the scope window persists displaying scope items in the scope window after the first primary display window and the second primary display window are displayed.

40. The system of claim 39 further comprising:
means for displaying a first secondary display window;
means for permitting a user to select an item in the first primary display window;
means for driving the first secondary display window off of the user selected item in the first primary display window, said first secondary display window being different from the first primary display window;
means for displaying a second secondary display window; and
means for driving the second secondary display window off of the user selected item in the first primary display window, wherein the means for driving the first secondary display window is independent of the means for driving the second secondary display window, said second secondary display window being different from the first primary display window and the first secondary display window.

41. The system of claim 39 further comprising:
means for displaying a first secondary display window;
means for driving the first secondary display window off of a user selected item in the first primary display window; and
means for linking the first secondary display window to the scope window, the first secondary display window being different from the first primary display window and the scope window.

42. A computer storage medium having computer-executable instructions for performing a method comprising:
forming a scope window displaying in a hierarchical structure scope items therein;
allowing a user to select at least one of the scope items in the scope window;
specifying a first set of instructions changing the content of the particular selected scope item by defining first primary objects to be displayed in a first primary display window;
forming the first primary display window in response to the first set of instructions for displaying the first primary objects which are dynamically linked to the scope window, said first primary display window being different from said scope window;
allowing the user to select at least one of the first primary objects in the first primary display window;
forming the first secondary display window displaying first secondary objects in response to the selected first primary objects and in response to the first set of instructions which are dynamically linked to the first primary display window, said first secondary display window being different from said scope window and said first primary display window;
allowing the user to select at least one of the first secondary objects in the first secondary display window;
specifying a second set of instructions changing the content of the particular selected scope item by defining first secondary objects to be displayed in a first secondary display window; and
dynamically linking the first secondary objects in the first secondary display window to the scope window in response to the second set of instructions so that the first secondary objects in the first secondary display window communicate with the scope window by focusing on the selected first secondary objects in the scope window, wherein the communication is independent of the communication between the first primary display window and the scope window.

43. The computer storage medium of claim 42, having further computer-executable instructions for:
assigning a particular object within the first secondary display window with a task list;

sharing the assigned task list with other objects in the scope window;

permitting the user to execute a new task on the particular object; and executing the new task on the other objects.

44. A computer storage medium having computer-executable instructions for performing a method comprising:

forming a scope window displaying in a hierarchical structure scope items therein;

allowing a user to select at least one of the scope items in the scope window;

receiving from the user a first set of instructions for changing the content of the particular selected scope item by defining first primary objects to be displayed in a first primary display window;

forming the first primary display window displaying the first primary objects in response to the at least one particular selected scope item and in response to the first set of instructions, said first primary display window being different from said scope window;

allowing a user to select at least one of the first primary objects in the first primary display window;

receiving from the user a second set of instructions for changing the content of the particular selected scope item by defining first secondary objects to be displayed in a first secondary display window;

forming the first secondary display window displaying the first secondary objects which are dynamically linked to the first primary display window in response to a selection of one or more first primary objects in the first primary display window and in response to the second set of instructions, said first secondary display window being different from said scope window and said first primary display window;

allowing a user to select at least one of the first secondary objects in the first secondary display window; and dynamically linking the first secondary objects in the first secondary display window to the scope window so that a command or selection by a user in the first secondary display window changes the focus or content of the scope window according to the selection or command.

45. A computer storage medium having computer-executable instructions for performing steps comprising:

forming a scope window displaying in a hierarchical structure scope items therein;

specifying a first set of instructions changing the content of the selected scope item by defining first primary objects to be displayed in a first primary display window;

forming the first primary display window displaying the first primary objects in response to the first set of instructions so that the first primary objects in the first primary display window are dynamically linked to the scope window, said first primary display window being different from said scope window; and specifying a second set of instructions changing the content of the particular selected scope item by defining second primary objects to be displayed in a second primary display window;

forming the second primary display window displaying the second primary objects in response to the second set of instructions so that the second primary objects in the second primary display window are dynamically linked to the scope window, said second primary display window being different from said scope window and said first primary display window; and defining window types of the first primary display window and of the second primary display window as a function of data driven from a query, wherein the driven data determines the window types.

46. The computer storage medium of claim 45, having further computer-executable instructions for performing the step of allowing a user to convert the scope window, the first primary display window, and/or second primary display window from one window type to another window type.

47. The computer storage medium of claim 46, wherein the window types include one or more of the following: a table, a graph, a list, a list control, a topological view, and a text window.

* * * * *